United States Patent [19]
Buffington, Jr.

[11] 4,091,350
[45] May 23, 1978

[54] INSULATING CORE FOR USE AS A STRAIN INSULATOR OR A COIL FORM

[76] Inventor: William E. Buffington, Jr., 1554 Montrose Ave., E. Jacksonville, Fla. 32210.

[21] Appl. No.: 745,821

[22] Filed: Nov. 29, 1976

[51] Int. Cl.[2] ........................ H01F 5/02; H01F 27/30; H01B 17/24; G01Q 1/00

[52] U.S. Cl. .................................... 336/208; 174/208; 338/303; 338/321; 343/722; 343/850; D13/17

[58] Field of Search ......... 174/138 R, 138 J, 174–177, 174/207, 208, 212; 219/355, 546; 336/207, 208, 338/58, 62, 63, 261, 263-266, 270, 282, 286, 296, 298, 299, 302, 303, 321; 24/115 J, 115 K, 129 R, 129 A, 129 D; 343/722, 749, 750, 752, 820, 821, 850, 866, 868, 895, 859, 865; 242/85.1, 125.2; D13/17, 18

[56] References Cited

U.S. PATENT DOCUMENTS

| | | | |
|---|---|---|---|
| 905,141 | 12/1908 | Bogue | 174/208 X |
| 1,415,240 | 5/1922 | Hynes | 338/302 X |
| 1,858,483 | 5/1932 | Conrad | 338/270 X |
| 2,093,872 | 9/1937 | McCoy | 174/208 |
| 2,422,458 | 6/1947 | Amy et al. | 343/722 |
| 2,653,992 | 9/1953 | Hill | 338/321 X |

*Primary Examiner*—Laramie E. Askin
*Attorney, Agent, or Firm*—Littlepage, Quaintance, Murphy, Richardson and Webner

[57] ABSTRACT

An insulating core including a helical groove for use in a coil form, U-shaped grooves for use in an insulator in compression and diametrical holes for use in an insulator in tension. The wire used in the system is part of an antenna system.

6 Claims, 11 Drawing Figures

INSULATING CORE FOR USE AS A STRAIN INSULATOR OR A COIL FORM

BACKGROUND OF THE INVENTION

1. Field of the Invention

The invention relates to an insulating core system for use in an antenna arrangement. The core is suitable for use as a strain insulator, either in compression or tension, and for use as a helical coil form of variable length.

2. Description of the Prior Art

Numerous coil forms and strain insulators are known in the prior art for use with antenna systems. There are special forms for many purposes. However, the prior art forms known to applicant are not adaptable to form tension and compression strain insulators and cores for helical coils of varying length.

U.S. Pat. No. 2,422,458 to Amy et al discloses a porcelain rod ½ inch in diameter having apertures in each end thereof for use as a core for a helical coil in an antenna system. The core is not readily adaptable for use as a compressive strain insulator or as a coil form for coils of different length on the same core.

U.S. Pat. No. 2,653,992 to Hill discloses an insulating plastic coil form which is cylindrical in shape and holds a helical coil thereon. No grooves or diametrical holes are provided for the coil and the form may not be used as a strain insulator except with the insulators fixedly embedded therein.

SUMMARY OF THE INVENTION

There is need for a single insulating core which can be used as a form for a helical coil or, alternatively, as a strain insulator in either compression or tension.

The present invention provides such a core, in which a plurality of fin segments define a helical groove for winding a helical coil, and in which two U-shaped grooves in quadrature and associated diametrical holes define paths for cables used in a stress insulator.

DESCRIPTION OF THE PREFERRED EMBODIMENTS

Figure 1:
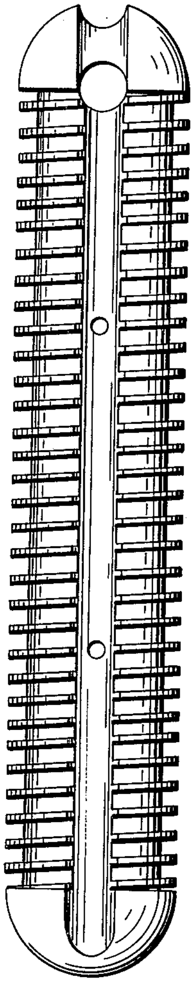
FIG. 1 is a front view of an insulating core according to the invention.
Figure 2:
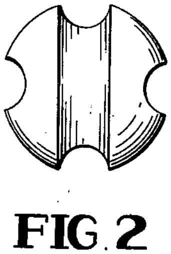
FIG. 2 is a top view of the core of FIG. 1.
Figure 3:
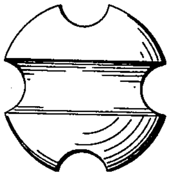
FIG. 3 is a bottom view of the core of FIG. 1.
Figure 4:
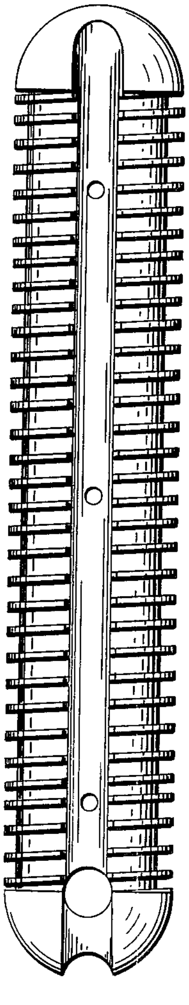
FIG. 4 is a side view of the core of FIG. 1.

FIGS. 1, 2, 3 and 4 respectively show front, top, bottom and side views of an insulating core according to the present invention. The various parts of this core and its uses as a coil form and as a strain insulator are more clearly set forth in FIGS. 5, 6, 7, 8, 9 and 10, to which reference is made for a showing of the various parts thereof.

The core includes a generally cylindrical elongated core 12 of electrically insulating material, preferably molded plastic material. Around the outer cylindrical wall of the core and integrally connected thereto are a plurality of fin segments 14 which are positioned to form a helical groove running around the core in which a coil of wire 16 may be wound. The helical groove extends from a first end 18 of a central portion of the core to a second end 20 of the central portion. A first hole 22 extends diametrically through the core at the first end 18 and a second hole 24 extends diametrically through the core at the second end 20. The first and second holes are preferably in quadrature, that is to say, the second hole and a central axis (not illustrated) of the cylindrical core define a plane perpendicular to the first hole, or stated another way, the first hole is displaced 90° from the second hole.

Rounded ends 26 and 28 are positioned at opposite ends of the cylindrical core and are integrally connected thereto.

Figure 5:
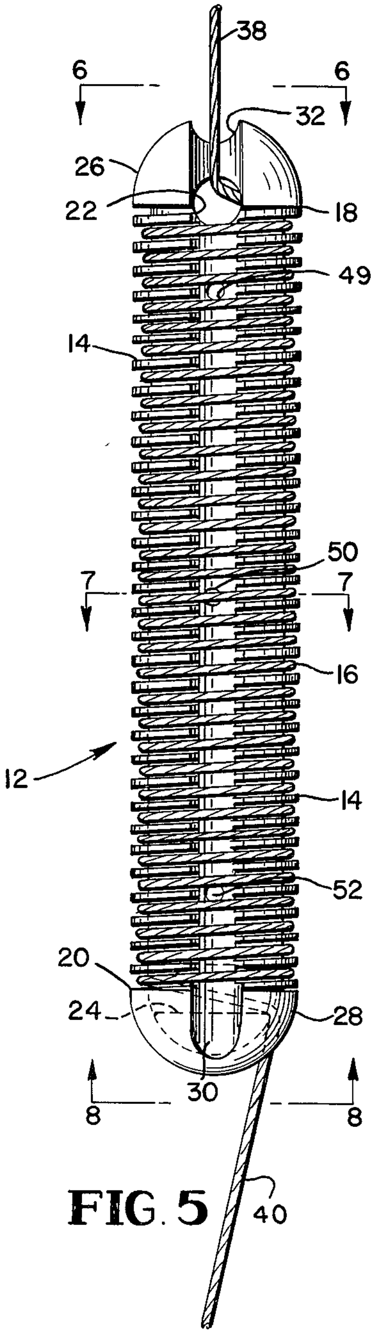
FIG. 5 is a side view of the core of FIG. 1, including a winding thereon.
Figure 6:
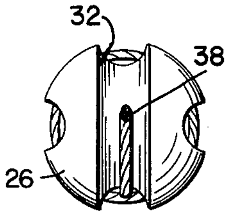
FIG. 6 is a top view of the core of FIG. 5.

A first U-shaped groove has a beginning point 30 near the second end 20, then extends lengthwise along a first side of the core (the side facing viewer in FIG. 5), around rounded end 26 in groove section 32, and then lengthwise along the side opposite the first side (side hidden from view in FIG. 5). A second U-shaped groove has a beginning point 34 near the first end 18, then extends lengthwise along a second side of the core (the side facing viewer in FIG. 9), around rounded end 28 in groove section 36, and then lengthwise along the side opposite the first side (side hidden from view in FIG. 9). The two U-shaped grooves are positioned 90° apart (in quadrature) on the core.

In FIG. 5, the coil of wire 16 has a first end 38 extending through the first hole 22 and a second end 40 extending through the second hole 24. The ends of the coil wire may be connected to guy wires in an antenna system or they may themselves be guy wires. The central portion of the coil 16 is located in the helical groove formed by the fin portions.

Figure 10:
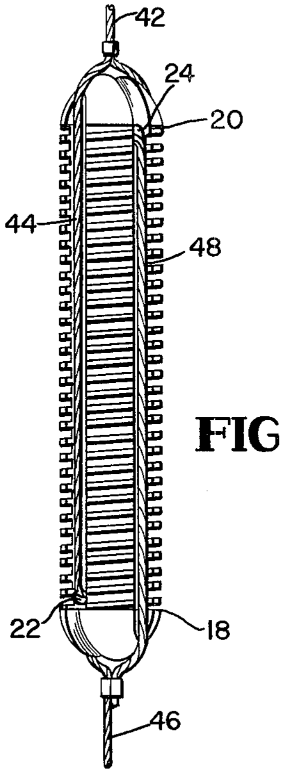
FIG. 10 is perspective view of the core of FIG. 1, including guy-wire connections for use of the insulator as a strain insulator in compression.

In FIG. 10, a first wire 42, which may be a guy wire in an antenna system, has a loop 44 at one end thereof. This loop is situated in one of the U-shaped grooves and extends through the first hole. A second similar wire 46 has a loop 48 at one end thereof. This second loop extends through the second hole. When the wires 42 and 46 are in tension, the core is held in compression and the two loops 44 and 48 further bind the core to prevent its splitting under strong compression. The core thus held in compression as a strain insulator prevents the two wires from coming in contact with each other and insulates them from each other.

Figure 7:
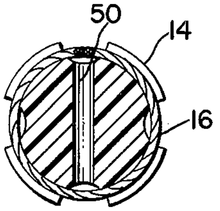
FIG. 7 is a cross-sectioned view of the core of FIG. 6.
Figure 8:
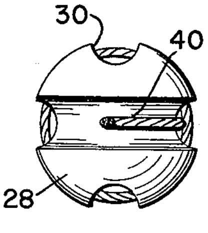
FIG. 8 is a bottom end view of the core of FIG. 6.
Figure 9:
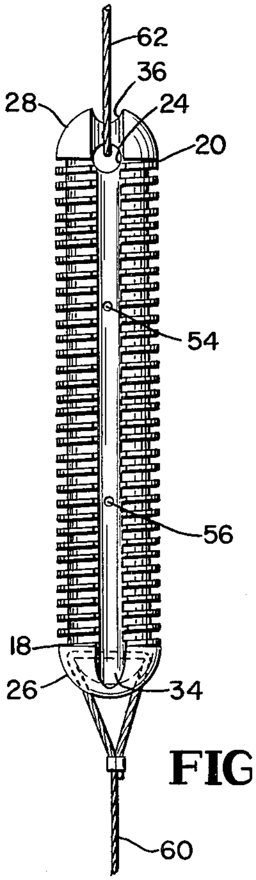
FIG. 9 is a front view of the core of FIG. 1, including guy-wire connections for use of the insulator as a strain insulator in tension.
Figure 11:
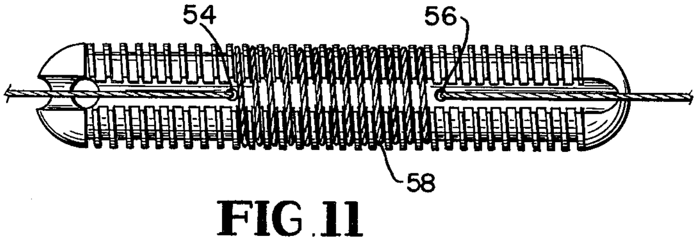
FIG. 11 is a front view of the core of FIG. 1 with a coil wound part-way along the length thereof.

As seen in FIGS. 5, 7 and 9, there are preferably several additional holes 49, 50, 52, 54 and 56 in the core at various positions along the central portion of the core. These additional holes extend diametrically through the core. The additional holes can be used in winding a short coil of wire 58, as shown in FIG. 11. Using the additional holes, coils of almost any length (in quarter-turn increments) can be wound from zero to the full turns capacity of the helical groove. In FIG. 11, the ends of the coil are connected to guy wires secured to the first and second holes.

FIG. 9 illustrates the use of the core as a strain insulator in tension. Ends 60 and 62 of guy wires are secured in the first and second diametrical holes 22 and 24.

When the guy wires are in tension, the core electrically insulates the guy wires while acting as a strain insulator.

I claim:

1. An article of manufacture comprising:

A. a generally cylindrical elongated core of electrically insulating material,

B. a plurality of fin segments positioned around a central portion of an outer cylindrical wall of the core and integrally attached thereto, the fin segments being positioned to form a helical groove therebetween running around the core and extending lengthwise from a first end of the central portion to a second end of the central portion, C. a first hole located at the first end of the central portion and extending diametrically through the cylindrical core, one end of the first hole being situated adjacent to a first end of the helical groove, D. a second hole located at the second end of the central portion and extending diametrically through the cylindrical core, E. rounded ends on each end of the cylindrical core and integrally attached thereto, F. a first U-shaped groove extending lengthwise along a first side of the cylindrical core, around one of the rounded ends, and lengthwise along a side of the core opposite the first side, and G. a second U-shaped groove positioned 90° around the core from the first U-shaped groove and extending lengthwise along a second side of the cylindrical core, around another of the rounded ends, and lengthwise along a side of the core opposite the second side.

2. An article of manufacture according to claim 1, wherein the second hole and the axis of the cylindrical core define a plane perpendicular to the first hole.

3. An article of manufacture according to claim 1, further comprising a coil of wire having a first end extending through the first hole, a second end through the second hole, and a central portion located in the helical groove formed by the fin portions.

4. An article of manufacture according to claim 1, further comprising:

A. a first wire having a loop at one end thereof situated in one of the U-shaped grooves and extending through the first hole, and B. a second wire having a loop at one end thereof situated in the other of the U-shaped grooves and extending through the second hole, whereby the core acts as a strain insulator when the first and second wires are in tension in opposite directions.

5. An article of manufacture comprising:

A. a generally cylindrical elongated core of electrically insulating material,

B. a plurality of fin segments positioned around a central portion of an outer cylindrical wall of the core and integrally attached thereto, the fin segments being positioned to form a helical groove therebetween running around the core and extending lengthwise from a first end of the central portion to a second end of the central protion, C. a first hole located at the first end of the central portion and extending diametrically through the cylindrical core, one end of the first hole being situated adjacent to the first end of the helical groove, D. a second hole located at the second end of the central portion and extending diametrically through the cylindrical core, E. a plurality of additional holes at various positions along the central portion of the core extending diametrically through the cylindrical core, and F. a coil of wire having a first end extending through one of the holes and a second end extending through another of the holes, at least one of the holes through which one of the ends extends being one of the additional holes, a central portion of the coil of wire being wound in a portion of the helical groove formed by the fins.

6. An article of manufacture comprising:

A. a generally cylindrical elongated core of electrically insulating material,

B. a plurality of fin segments positioned around a central portion of an outer cylindrical wall of the core and integrally attached thereto, the fin segments being positioned to form a helical groove therebetween running around the core and extending lengthwise from a first end of the central portion to a second end of the central portion.

C. a first hole located at the first end of the central portion and extending diametrically through the cylindrical core, one end of the first hole being situated adjacent to a first end of the helical groove, D. a second hole located at the second end of the central portion and extending diametrically through the cylindrical core, the second hole having its ends positioned 90° around the core from the ends of the first hole, E. rounded ends on each end of the cylindrical core and integrally attached thereto, F. a first U-shaped groove extending lengthwise along a first side of the cylindrical core, around one of the rounded ends, and lengthwise along a side of the core opposite the first side, G. a second U-shaped groove positioned 90° around the core from the first U-shaped groove and extending lengthwise along a second side of the cylindrical core, around another of the rounded ends, and lengthwise along a side of the core opposite the second side, and H. a plurality of additional holes at various positions along the central portion of the core extending diametrically through the cylindrical core.

* * * * *